April 5, 1932.  C. B. ROBINSON  1,852,937
AUGER BIT
Filed Nov. 19, 1930   2 Sheets-Sheet 1
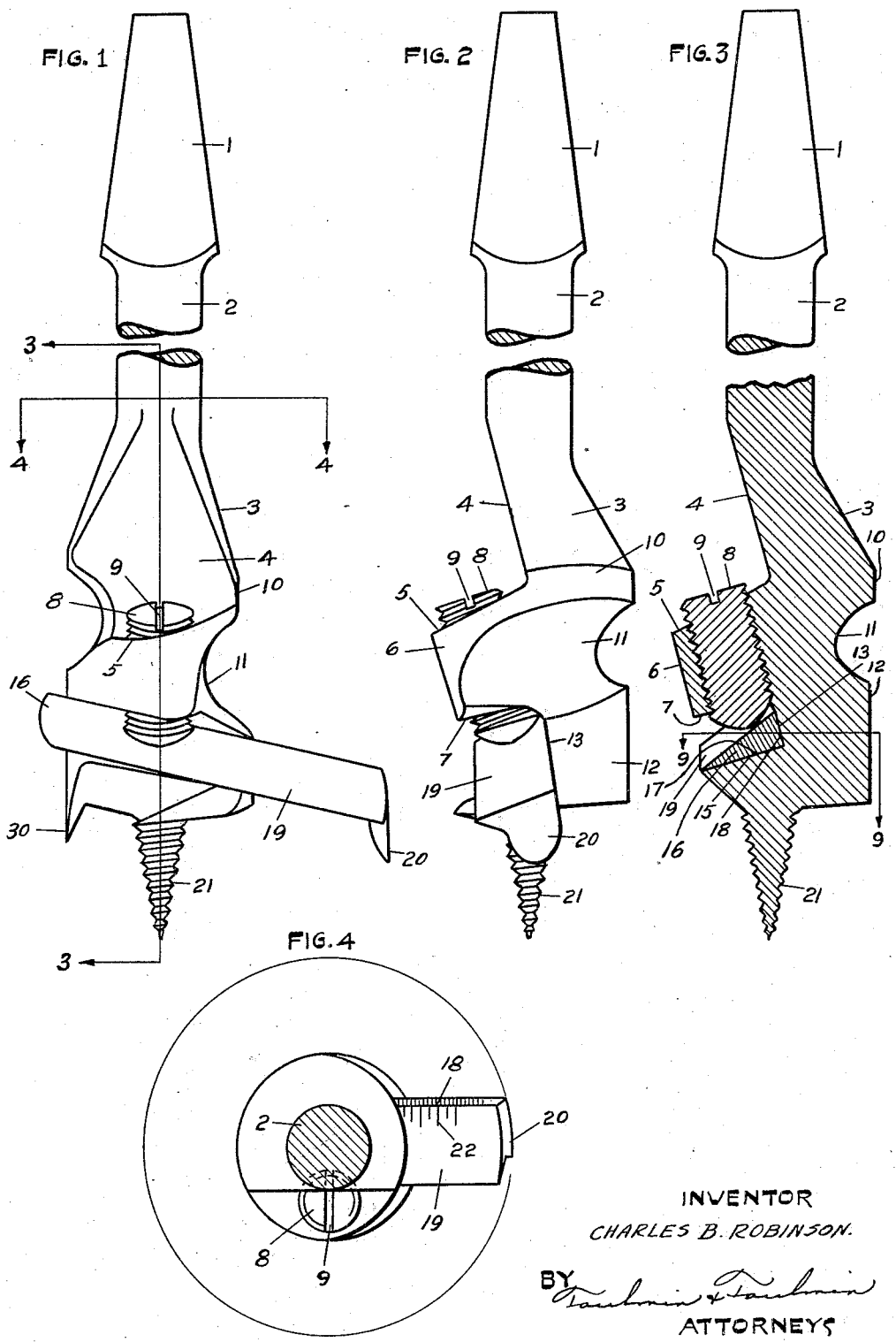
INVENTOR
CHARLES B. ROBINSON.
BY
ATTORNEYS April 5, 1932.   C. B. ROBINSON   1,852,937
AUGER BIT
Filed Nov. 19, 1930   2 Sheets-Sheet 2
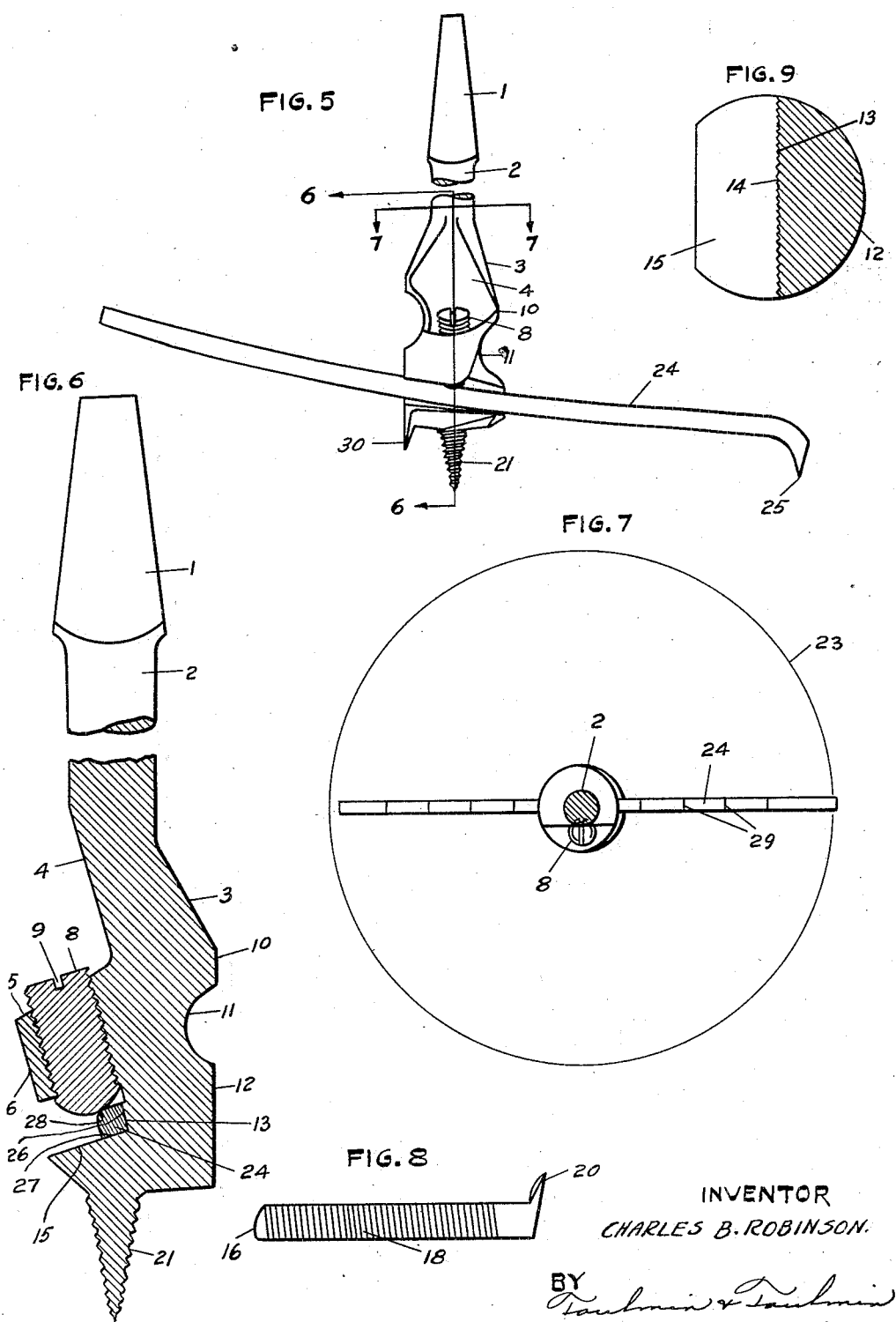
INVENTOR
CHARLES B. ROBINSON.
BY
ATTORNEYS Patented Apr. 5, 1932

1,852,937

UNITED STATES PATENT OFFICE

CHARLES B. ROBINSON, OF WILMINGTON, OHIO, ASSIGNOR TO THE IRWIN AUGER BIT COMPANY, OF WILMINGTON, OHIO, A CORPORATION OF OHIO

AUGER BIT

Application filed November 19, 1930. Serial No. 496,576.

My invention relates to auger bits, and particularly to extension bits and to scribing mechanism in combination therewith.

It is the object of my invention to provide a combined extension bit and scribing mechanism.

It is a further object to provide an extension bit in which an extension cutter can be held in rigid engagement with the bit; in which the extension member is so arranged that it may be quickly adjusted and held adjusted by a single set screw; in which the extension member will easily lift the chips as they are cut by the cutting lip and discharge those chips into the hole which is being cut and when they have accumulated a sufficient depth discharge the chips through a spiral groove that will serve to lift the chips out of the hole.

It is a further object to provide that the surface of the extension cutter over which the chips move is in communication with the chip-removing groove.

It is my object to provide an interchangeable extension cutter and scribe with a common bit useful for either purpose.

Referring to the drawings:

Figure 1 is a front elevation of the extension bit;

Figure 2 is a side elevation thereof from the cutting lip side;

Figure 3 is a section on the line 3—3 of Figure 1;

Figure 4 is a section on the line 4—4 of Figure 1 showing how the cutting lip on the extension member may be used as a scribe;

Figure 5 is a front elevation of the bit with the scribing mechanism interchangeably mounted in the place of the extension cutter;

Figure 6 is a section on the line 6—6 thereof;

Figure 7 is a section on the line 7—7 thereof showing the scale on the scribe;

Figure 8 is a rear elevation of the extension cutter showing its non-slipping, corrugated face;

Figure 9 is a section on the line 9—9 of Figure 3 looking in the direction of the arrows and showing the non-slipping face having corrugations on the shouldered groove for receiving the corrugated face of the extension member so that such corrugations interlock and prevent relative movement.

Referring to the drawings in detail, 1 is the shank of the shaft 2 of a bit having the expanded head 3 which has a diagonally-disposed, flat face 4. A shoulder 5 is provided at right angles to the face 4 forming a diagonally-disposed extension 6 through the under face of which 7 projects the retaining screw 8 that may be adjusted through the slot 9 above the upper surface 5 of the projection 6 which carries the screw 8.

The head 3 is continued, as at 10, on the face of which is formed a chip groove 11. Below the chip groove is an extension 12 that is cut away to form a face 13 that is corrugated as at 14 and a diagonally-disposed surface 15, both of which faces support and engage the lateral extension cutter generally designated 16.

The lower face 17 of this cutter engages the sloping surface 15 and the corrugated face 18 of the extension cutter engages the corrugated face 13 of the bit.

The upper sloping face 19 of the cutter engages the chips, elevates them and discharges them either into the groove 11 or freely to a point behind the cutter into the hole being cut. The upper surface 19 is also engaged by the nose of the set screw 8 which thus forces the extension cutter downwardly on the surface 15 and laterally against the corrugated surface 13 to hold it in position.

The extension cutter is provided with a cutting lip 20. This cutting lip may also act as a scribe as the point of the cutting lip 20 is located above the entering screw 21 carried on the extreme end of the bit.

The extension cutter 16 is provided with a scale 22 to facilitate the setting of the extension cutter to cut a hole of given dimensions.

In the event that it is desired to enscribe a larger circle, such as the circle 23, a scribing tool consisting of an arcuate body 24 and a depending scribing nose 25 is provided.

This scribe has a face 26 and a face 27 at angles to one another adapted to fit against the faces 13 and 15 and be held in position by the set screw 8 which engages the arcuate corner 28 of the scribing implement.

A scale 29 indicates the diameter of the circle desired to be enscribed.

The bit is further provided with the usual stationary cutting lip 30 which cooperates in the cutting operation.

It will be understood that I desire to comprehend within my invention such modifications as may be necessary to adapt it to varying conditions and uses.

Having thus fully described my invention, what I claim as new and desire to secure by Letters Patent, is:

1. In combination, a bit having an angular groove, the bottom of which is inclined to the axis of the bit, a set screw carried by said bit extending into said groove at right angles to the bottom thereof, and an extension cutter carried in said groove having an upper face inclined to its lower face, the upper face of which is engaged by said set screw whereby the angular extension cutter is forced upwardly and inwardly in said groove.

2. In combination, a bit having an angular groove with a wall and a bottom inclined to the axis of the bit and at a right angle to the wall, a set screw carried by said bit extending into said groove at right angles to the bottom thereof, and an extension cutter carried in said groove having an upper face inclined to its lower face, the upper face of which is engaged by said set screw whereby the angular extension cutter is forced upwardly and inwardly in said groove, said groove having its vertical wall engaged by a vertical face of said extension member.

3. In combination, a bit having an angular groove with a wall and a bottom inclined to the axis of the bit and at a right angle to the wall, a set screw carried by said bit extending into said groove at right angles to the bottom thereof, and an extension cutter carried in said groove having an upper face inclined to its lower face, the upper face of which is engaged by said set screw whereby the angular extension cutter is forced upwardly and inwardly in said groove, said extension member having a vertical corrugated face for engaging the vertical wall of the groove.

4. In combination, a bit, an offset head thereon having a tilted screw supporting lug, a set screw mounted therein at an angle to the axis of the bit, said offset head having an angular groove for receiving the end of said set screw, and a triangular-in-section extension cutter mounted in said groove, one face of which is engaged by said set screw, an entering screw in said offset head below said extension cutter, and a cutting lip on the end of the extension cutter, and a cutting lip on said head of the bit oppositely disposed from one another on opposite sides of said entering screw.

5. In combination, a bit, an offset head thereon having a screw tilted to the axis of the bit, a set screw mounted therein at an angle to the axis of the bit, said offset head having an angular groove receiving the end of said set screw, and a triangular-in-section extension cutter mounted in said groove, one face of which is engaged by said set screw, an entering screw in said offset head below said extension cutter, a cutting lip on the end of the extension cutter, cutting lips on said head of the bit oppositely disposed from one another on opposite sides of said entering screw, and corrugated means between said extension cutter and said groove on the head for preventing lateral slipping of said cutter in the head.

6. In combination, a bit, a laterally-disposed head thereon, an offset lug on said head, a set screw therein at an angle to the axis of the bit, said head having a transverse slot into which said screw projects, said slot having a wall slightly inclined to the axis of the screw and a wall at right angle to the first-named wall, and a triangular-shaped, laterally-extending extension member in said groove, two faces of which engage the walls of said slot at right angles to one another, and the third face of which forms a wedge engaging with the end of said screw.

7. In combination, a bit, a laterally-disposed head thereon, an offset lug on said head, a set screw therein at an angle to the axis of the bit, said head having a transverse slot into which said screw projects, said slot having a wall slightly inclined to the axis of the screw and a wall at right angle to the first-named wall, and a triangular-shaped, laterally-extending extension member in said groove, two faces of which engage the walls of said slot at right angles to one another, and the third face of which forms a wedge engaging with the end of said screw, and corrugated means between said slot and said extension member for preventing lateral movement of the extension member in the slot.

8. In a bit, a head having a spiral groove and an extension cutter seat, said seat having a pair of right angularly disposed walls, one of said walls being inclined to the horizontal, a triangular extension cutter in said seat with two sides engaging the walls of the seat, and a third side in line with the spiral groove and a screw at right angles to the horizontally inclined side to hold the extension cutter in the seat.

In testimony whereof, I affix my signature.

CHARLES B. ROBINSON.